G. O. HOUCK.
Corn-Planters.
No. 138,158. Patented April 22, 1873.
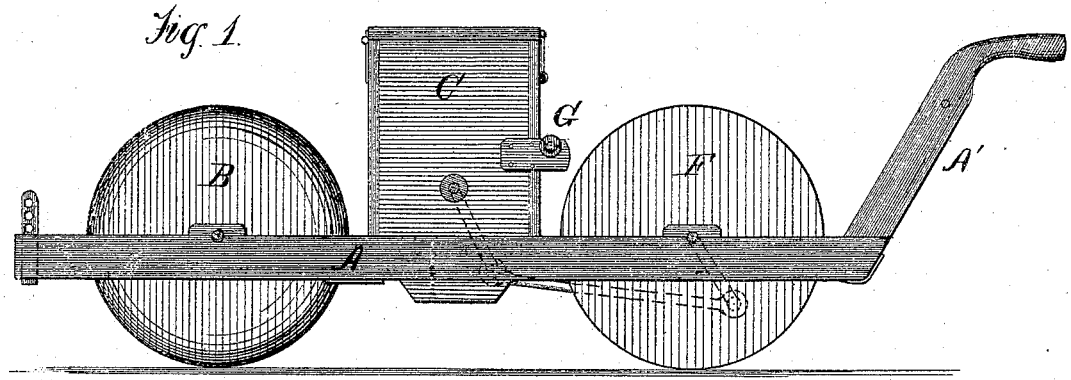
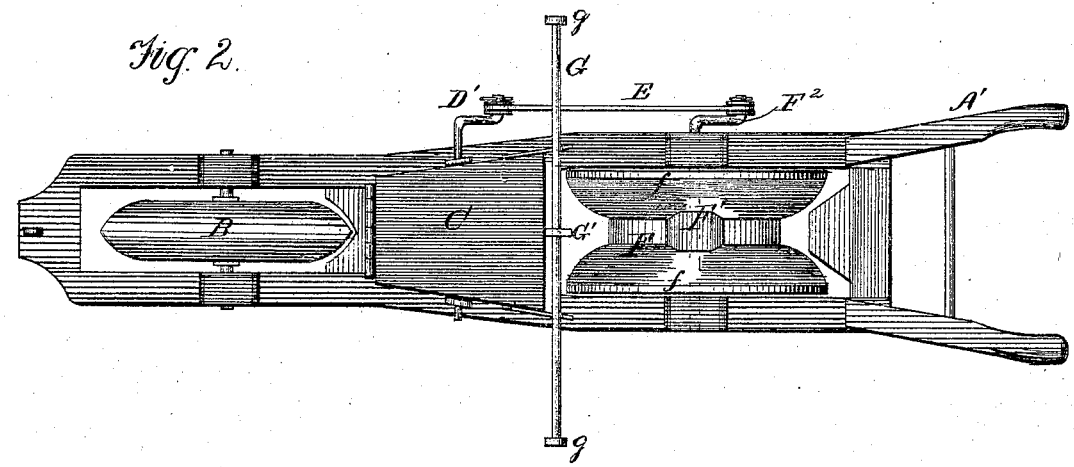
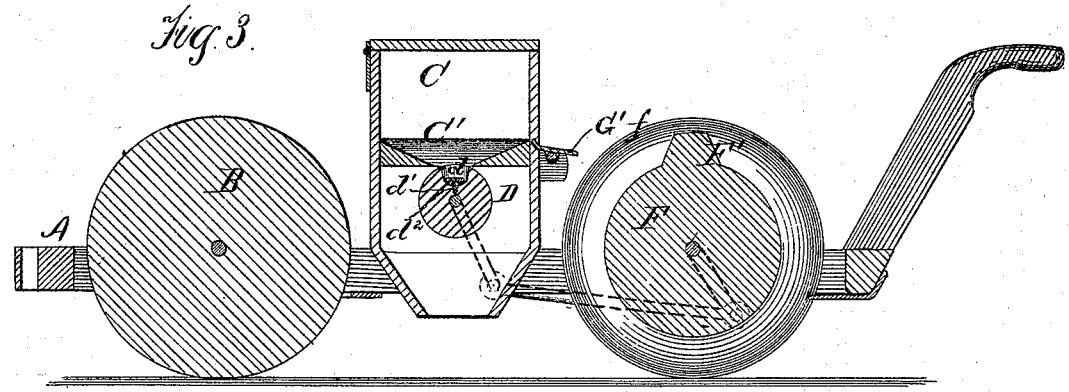
Witnesses: W. Bradford
Geo. O. Houck, Inventor
D. P. Holloway & Co., Att'ys

UNITED STATES PATENT OFFICE.

GEORGE O. HOUCK, OF SPRINGFIELD, OHIO.

IMPROVEMENT IN CORN-PLANTERS.

Specification forming part of Letters Patent No. 138,158, dated April 22, 1873; application filed February 21, 1873.

*To all whom it may concern:*

Be it known that I, GEORGE O. HOUCK, of Springfield, in the county of Clark and State of Ohio, have invented certain Improvements in Corn-Planters, of which the following is a specification:

My improvement consists in constructing a grooved or concaved covering-wheel with a transverse rib or bar across its concave tread, for the twofold purpose of marking the hills and pressing the loose soil down over the seed, the covering-wheel and dropper being so connected and arranged relatively that in operating the machine the rib of the wheel will make impressions at the exact spots where seed has been dropped.

Figure 1 is an elevation of my improved corn-planter. Fig. 2 is a plan view of the same. Fig. 3 is a vertical longitudinal section.

The same letters of reference are employed in all the figures in the designation of like parts.

The various parts of the machine are mounted upon a frame, A, which is at its front end provided with a clevis made vertically adjustable in the usual manner, to regulate the depth of cut of the furrowing-wheel B. At the rear end the frame carries the handles A', by which the machine is manipulated. The wheel B is beveled upon both sides near its periphery, so as to form a central sharp edge, with which it cuts into the soil, forming a continuous trench or furrow for the reception of the seed. C refers to the seed-box, which is arranged directly in rear of the furrowing-wheel, terminating at its lower extremity in a boot for guiding the seed into the furrow. Underneath the perforated partition C' of this box is located the seed-cylinder or wheel D provided with a cavity, $d$, which alternately receives a determinate quantity of seed from the hopper and drops it into the boot for deposition in the furrow. The size of the cavity $d$ of the seed-cylinder can be changed by adjusting the screw $d^1$, the head of which, together with the button $d^2$ fixed to it, constitutes the bottom of the cavity. The seed-cylinder has its bearings in the sides of the seed-box, and one of its journals is cranked or provided with a crank, as at D', the wrist of which is connected by the coupling-rod E to the wrist of the crank $F^2$ on one of the journals of the covering-wheel F. The form of the tread of this wheel is clearly shown in Fig. 2. The side flanges $ff$ upon the sides of the central groove are made sharp at their outer edges so as to enable them to readily enter the soil, which is forced inward by them to fill the furrow and cover the seed. $F^1$ is rib or bar extending transversely across the groove of the covering-wheel. In the example illustrated the continuous rotation of the covering-wheel gives an oscillatory motion to the seed-cylinder so as to drop one cupful of seed during each revolution of the wheel; and the cranks D' and $E^2$ are so arranged with reference to the seed-cavity $d$ of the cylinder D and the rib $F^1$ of the covering-wheel that said rib $F^1$ will make an impression on each hill of corn in the forward progression of the machine. The wheels B and F stand exactly in line, and a scraper is provided for each, as shown in Fig. 2. The guide-rod G rests in bearings on the back of the seed-box having a collar or head, $g$, at each end to limit its projection in either direction. The rod is of such length that when projected with one end as far as the head on the other end will permit, the overhung end will terminate at a distance from the center line of the machine—where the seed is dropped—equal to the required distance between the rows. In planting a return-row the operator must see to it that the projected end of the guide-rod has its collar or head standing directly over the row previously planted. In this he is aided by the marks made by the rib $F^1$ of the covering-wheel. G' refers to a spring bearing against the guide-rod G with sufficient force to prevent its sliding too easily in its bearings.

What I claim as my invention, and desire to secure by Letters Patent, is—

The combination of the furrowing-wheel B, seed-dropper D D', coupling-rod E, crank $F^2$, and concaved covering-wheel F having the transverse rib $F^1$, all constructed and arranged substantially as and for the purpose set forth.

In testimony whereof I have signed my names to this specification in the presence of two subscribing witnesses.

GEORGE O. HOUCK.

Witnesses:
 REUBEN MILLER,
 J. W. JARRETT.